(12) United States Patent
Miyazaki et al.

(10) Patent No.: US 11,659,126 B2
(45) Date of Patent: *May 23, 2023

(54) IMAGE PROCESSING APPARATUS FOR DISPLAYING MALFUNCTIONING PARTS AND SELECTABLE REFERENCE SOUNDS

(71) Applicant: TOSHIBA TEC KABUSHIKI KAISHA, Tokyo (JP)

(72) Inventors: Sou Miyazaki, Sunto Shizuoka (JP); Hiroyo Tanaka, Koto Tokyo (JP); Kazuhiro Ogura, Hiratsuka Kanagawa (JP); Masaki Narahashi, Shinagawa Tokyo (JP); Satoshi Oyama, Mishima Shizuoka (JP); Tatsuya Inagi, Izu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/678,982

(22) Filed: Feb. 23, 2022

(65) Prior Publication Data

US 2022/0182510 A1  Jun. 9, 2022

Related U.S. Application Data

(63) Continuation of application No. 17/180,880, filed on Feb. 22, 2021, now Pat. No. 11,297,201, which is a
(Continued)

(30) Foreign Application Priority Data

Dec. 20, 2019 (JP) .............................. JP2019-230410
Dec. 18, 2020 (JP) .............................. JP2020-210580

(51) Int. Cl.
*H04N 1/00* (2006.01)
*H04N 1/32* (2006.01)

(52) U.S. Cl.
CPC ..... *H04N 1/32657* (2013.01); *H04N 1/00029* (2013.01); *H04N 1/00039* (2013.01);
(Continued)

(58) Field of Classification Search
CPC .......... H04N 1/32657; H04N 1/00029; H04N 1/00039; H04N 1/00344; H04N 1/32625
See application file for complete search history.

(56) References Cited

U.S. PATENT DOCUMENTS

2008/0307319 A1* 12/2008 Iwata ..................... G06K 15/00
  715/748
2009/0237741 A1* 9/2009 Kurahashi ............... H04L 67/75
  358/406

(Continued)

FOREIGN PATENT DOCUMENTS

| JP | 2012-136300 A | 7/2012 |
| JP | 2015-160364 A | 9/2015 |
| JP | 2016-022619 A | 2/2016 |

OTHER PUBLICATIONS

Extended European Search Report dated Feb. 26, 2021 in corresponding European Patent Application No. 20196911.0, 8 pages.

*Primary Examiner* — Benjamin O Dulaney
(74) *Attorney, Agent, or Firm* — Kim & Stewart LLP

(57) ABSTRACT

An image processing apparatus includes a display device and a processor. The processor is configured to generate a first screen for display on the display device and on which one of a plurality of malfunctioning part candidates of the image processing apparatus and one of a plurality of timings at which a particular sound was output by the image processing apparatus that malfunctioned, are selectable, when a first malfunctioning part candidate and a first timing are selected on the first screen, generate a second screen for display on the display device and on which one or more reference sounds corresponding to the particular sound are
(Continued)

selectable, and when one of the reference sounds is selected on the second screen, generate error information indicating the first malfunctioning part candidate and the selected reference sound.

20 Claims, 11 Drawing Sheets

Related U.S. Application Data continuation-in-part of application No. 17/003,903, filed on Aug. 26, 2020, now Pat. No. 11,070,702.

(52) U.S. Cl.
CPC ..... *H04N 1/00344* (2013.01); *H04N 1/00411* (2013.01); *H04N 1/00421* (2013.01); *H04N 1/32625* (2013.01)

(56) References Cited

U.S. PATENT DOCUMENTS

| | | |
|---|---|---|
| 2010/0079803 A1 | 4/2010 | Takeya |
| 2013/0321874 A1 | 12/2013 | Kaneko et al. |
| 2015/0156350 A1* | 6/2015 | Kogure .............. H04N 1/32694 358/1.15 |
| 2016/0048811 A1* | 2/2016 | Asai ....................... G07C 5/085 705/305 |
| 2017/0223195 A1 | 8/2017 | Miyamori et al. |
| 2017/0223196 A1* | 8/2017 | Udaka ................ H04N 1/00037 |
| 2020/0084321 A1* | 3/2020 | Umeda .............. H04N 1/00244 |

* cited by examiner

IMAGE PROCESSING APPARATUS FOR DISPLAYING MALFUNCTIONING PARTS AND SELECTABLE REFERENCE SOUNDS

CROSS-REFERENCE TO RELATED APPLICATIONS

This application is a continuation application of U.S. non-Provisional patent application Ser. No. 17/180,880, filed on Feb. 22, 2021, which is a Continuation-in-Part of U.S. non-Provisional patent application Ser. No. 17/003,903, filed on Aug. 26, 2020, now U.S. Pat. No. 11,070,702, issued on Jul. 20, 2021, which is based upon and claims the benefit of priority from Japanese Patent Application No. 2019-230410, filed on Dec. 20, 2019, and Japanese Patent Application No. 2020-210580, filed on Dec. 18, 2020, the entire contents of which are incorporated herein by reference.

FIELD

Embodiments described herein relate generally to an image processing apparatus, a method performed thereby, and a program stored on non-transitory computer readable medium.

BACKGROUND

Conventionally, there has been known an image processing apparatus that outputs a notification when a malfunction occurs.

When a malfunction occurs, it is common for some abnormal noise to be made by the image processing apparatus. A maintenance person or other operator may be able to hear this sound and identify the likely cause of the malfunction that has occurred in the image processing apparatus. However, generally, the image processing apparatus itself may be unable to repeat the sound for the maintenance person or otherwise provide a particularized notice to the maintenance person according to the sound associated with the malfunction. A non-specialist operation may be unable to sufficiently describe the sound that was associated with the malfunction. An operator could try to record the abnormal noise/sound. However, often due to security concerns or the like, recording of sounds being output from the image processing apparatus during its operation is usually not permitted. As a result, extra time may be required to identify the cause of the malfunction that has occurred in the image processing apparatus.

DETAILED DESCRIPTION

Figure 1:
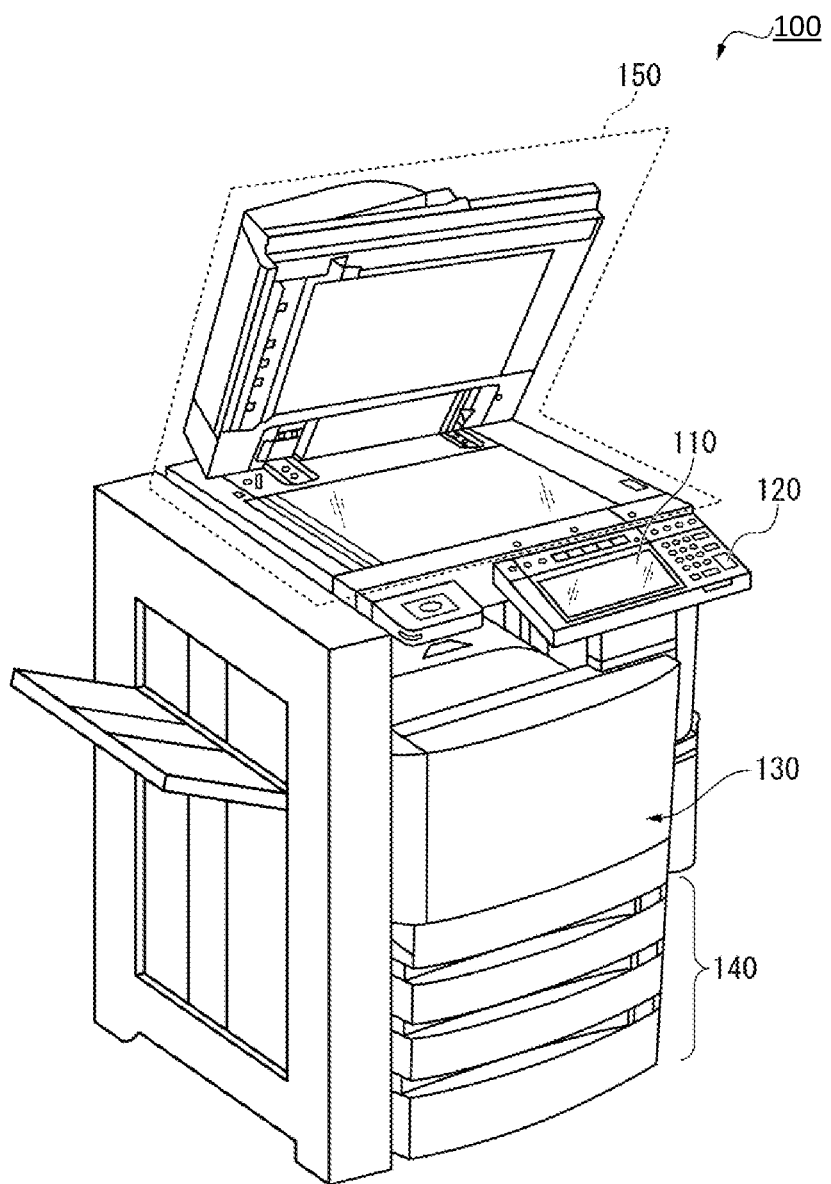
FIG. 1 is an external view of an image processing apparatus according to an embodiment.

One or more embodiments provide an image processing apparatus capable of playing a sound selected in advance similar to an abnormal noise when a malfunction is detected.

An image processing apparatus in one embodiment includes a display device and a processor. The processor is configured to generate a first screen for display on the display device and on which one of a plurality of malfunctioning part candidates of the image processing apparatus and one of a plurality of timings at which a particular sound was output by the image processing apparatus that malfunctioned, are selectable, when a first malfunctioning part candidate and a first timing are selected on the first screen, generate a second screen for display on the display device and on which one or more reference sounds corresponding to the particular sound are selectable, and when one of the reference sounds is selected on the second screen, generate error information indicating the first malfunctioning part candidate and the selected reference sound.

Hereinafter, an image processing apparatus according to an example embodiment will be described with reference to the drawings. In the drawings, the same components are denoted by the same reference numerals.

(Details of Image Processing Apparatus)

Hereinafter, with reference to FIG. 1, an image processing apparatus 100 will be described.

FIG. 1 is an external view illustrating the image processing apparatus 100 according to an embodiment. The image processing apparatus 100 is, for example, a device that performs image processing, such as a multifunction peripheral (MFP), a scanner, and a facsimile (FAX), for example. The image processing is a process related to an image. The image processing includes, for example, a process of forming an image on a sheet, a process of reading information about an image printed on a sheet, a process of recording (storing) the image information, and a process of transmitting an image to another apparatus.

The image processing apparatus 100 includes a display 110, a control panel 120, a printer unit 130, a sheet storage unit 140, and an image reading unit 150. The printer unit 130 of the image processing apparatus 100 may be a device for fixing a toner image, or may be an ink jet type device.

The image processing apparatus 100 reads an image printed on a sheet, generates digital data, and generates an image file. The sheet is, for example, a document, a paper on which characters, images, or the like are printed, and the like. The sheet may be any medium as long as it can be read by the image processing apparatus 100.

The display 110 is a display device such as a liquid crystal display, an organic EL (Electro Luminescence) display. The display 110 displays various kinds of information related to the image processing apparatus 100.

The control panel 120 includes a plurality of buttons. The control panel 120 receives an input for some operation made by a user. The control panel 120 outputs a signal corresponding to the operation made by the user to the control unit of the image processing apparatus 100. The display 110 and the control panel 120 may be integrated into a touch-enabled display.

The printer unit 130 forms an image on the sheet based on the image information generated by the image reading unit 150 or the image information received through a communication path. The printer unit 130 forms an image by, for example, the following processing. An image forming unit of the printer unit 130 forms an electrostatic latent image on a photosensitive drum based on image information. The image forming unit of the printer unit 130 forms a visible image by attaching a developer (e.g., a toner) to the electrostatic latent image. A transfer unit of the printer unit 130 transfers the visible image onto a sheet. A fixing unit of the printer unit 130 fixes the visible image on the sheet by heating and pressing the sheet. The sheet on which the image is formed may be a sheet stored in the sheet storage unit 140, or may be a sheet manually fed by the user.

The sheet storage unit 140 stores sheets used for image formation in the printer unit 130.

The image reading unit 150 reads image information from a sheet as brightness and darkness signals of light. The image reading unit 150 records the read image information. The recorded image information may be transmitted to another information processing apparatus via a network. The recorded image information may be formed on another sheet by the printer unit 130.

(Configuration of Image Processing Apparatus)

Hereinafter, with reference to FIG. 2, a hardware configuration of the image processing apparatus 100 will be described.

Figure 2:
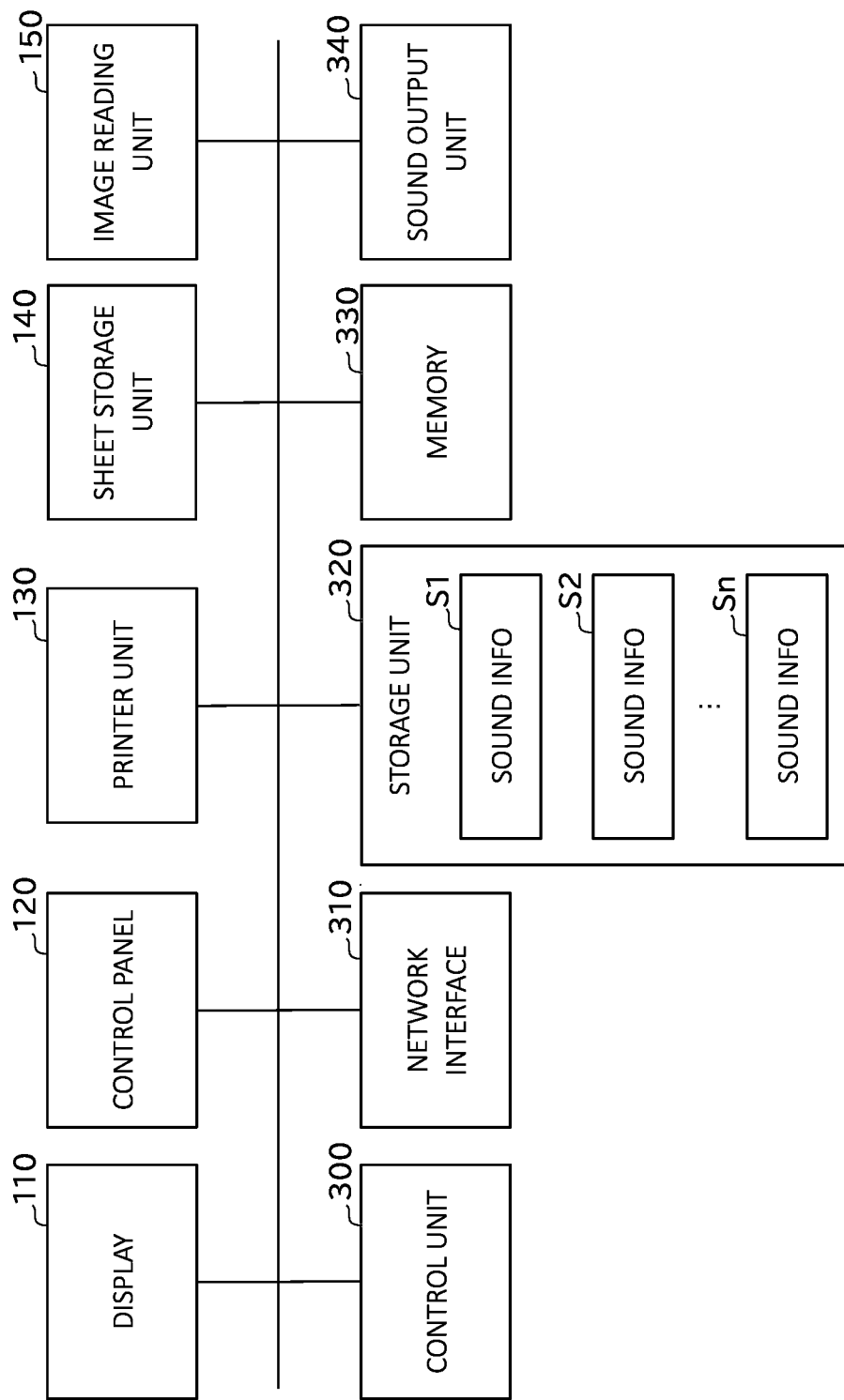
FIG. 2 is a hardware diagram of an image processing apparatus.

FIG. 2 is a hardware diagram of the image processing apparatus 100.

The image processing apparatus 100 includes a display 110, a control panel 120, a printer unit 130, a sheet storage unit 140, and an image reading unit 150. The image processing apparatus 100 also includes a control unit 300, a network interface 310, a storage unit 320, a memory 330, and a sound output unit 340. These units included in the image processing apparatus 100 are communicably connected to each other via a system bus.

The control unit 300 includes a central processing unit (CPU). The control unit 300 controls each unit of the image processing apparatus 100. The control unit 300 executes a program(s) and consequently executes various types of processing according to program instructions or the like. The control unit 300 recognizes an instruction input by a user via the control panel 120. That is, the control unit 300 recognizes an operation specified by the user via the control panel 120. The control unit 300 executes control processing on the basis of the recognized instruction.

An image processing apparatus typically makes different noises depending on the malfunction that has occurred therein. A maintenance operator may be able to hear this abnormal noise and, based on previous experience, identify a cause of the malfunction. However, maintenance operator may not be on-site or otherwise unable to hear the noise when it occurs in the image processing apparatus. Thus, it may be difficult to provide the maintenance operator with information corresponding to the sound in a manner close enough to the abnormal sound for diagnostic purposes. For this reason, an operator may want to record the abnormal noise. However, recording is often not permitted for security reasons depending on the location where the image processing apparatus is installed. As a result, the operator sometimes needs extra time to identify the cause of the malfunction that has occurred in the image processing apparatus. In addition, such an abnormal noise often occurs only once in the image processing apparatus. In such a case, the operator may lose a chance to record the abnormal noise.

Therefore, the control unit 300 transmits, to another device, at least one of: first sound information corresponding to a first operation received by the control panel 120, and first sound identification information specifying the first sound information, from among a plurality of pieces of sound information indicating different sounds from each other. This means that the user can select sound information indicating a sound similar to the abnormal noise that may occur when the image processing apparatus 100 malfunctions, and the image processing apparatus 100 can notify another apparatus of the selected sound information. Therefore, the image processing apparatus 100 can notify a sound selected by the user as a sound similar to the abnormal noise. In particular, when each of the plurality of pieces of sound information is information indicating the abnormal noise that can be heard from the image processing apparatus 100, the image processing apparatus 100 can more reliably notify the other apparatus of the sound similar to the abnormal noise.

Additionally, even if each of the plurality of pieces of sound information is a sound that is different from the abnormal noise that occurs in the image processing apparatus 100, the image processing apparatus 100 can notify another apparatus of a sound that the user thinks is similar to the abnormal noise. The first sound identification information may be any information as long as it is capable of identifying the first sound information, and is, for example, a Uniform Resource Locator (URL) indicating a storage location of the first sound information on the Internet. The first sound identification information may be, for example, a file name of the first sound information. Hereinafter, as an example, a case will be described in which the control unit 300 transmits, to another apparatus, the first sound information corresponding to the first operation received by the control panel 120, from among the plurality of pieces of sound information indicating the different sounds from each other.

The network interface 310 transmits and receives data to and from other devices. The network interface 310 operates as an input interface, and receives data transmitted from another device. In addition, the network interface 310 operates as an output interface, and transmits data to another device.

The storage unit 320 is, for example, an auxiliary storage device such as a hard disk drive (HDD), a solid state drive (SSD), or the like. The storage unit 320 stores various types of information. For example, the storage unit 320 stores a program(s) to be executed by the control unit 300. The programs include, for example, firmware and application program.

In the example illustrated in FIG. 2, the storage unit 320 stores n pieces of sound information S1 to Sn. n may be any integer greater than or equal to two. The n pieces of sound information are examples of a plurality of pieces of sound information indicating different sounds from each other. It is desirable that some or all of the sound information S1 to Sn indicate abnormal noises that may be heard from the image processing apparatus 100 when it malfunctions. This is because the user easily selects sound information indicating a sound similar to the abnormal noise from among the n pieces of sound information. The sound similar to the abnormal noise may be selected from a different sound from the noise that may be heard from the image processing apparatus 100. For this reason, some or all of the sound information S1 to Sn may indicate different sounds from the abnormal noises that may be heard from the image processing apparatus 100.

The memory 330 is, for example, a random access memory (RAM). The memory 330 temporarily stores information used by the units of the image processing apparatus 100. The memory 330 may store the image information read by the image reading unit 150, a program(s) for operating each unit, and the like.

The sound output unit 340 is, for example, a speaker. The sound output unit 340 outputs a sound corresponding to a sound signal output from the image processing apparatus 100. The sound output unit 340 may be a separate unit from the image processing apparatus 100. In such a case, the sound output unit 340 is an external speaker.

(Process of Transmitting the First Sound Information Selected by the User to Another Device)

As described above, the image processing apparatus 100 can transmit the first sound information selected by a user to another apparatus. Therefore, in the following, a description will be given of a process of transmitting first sound information selected by a user to another apparatus among processes performed by the image processing apparatus 100.

Figure 3:
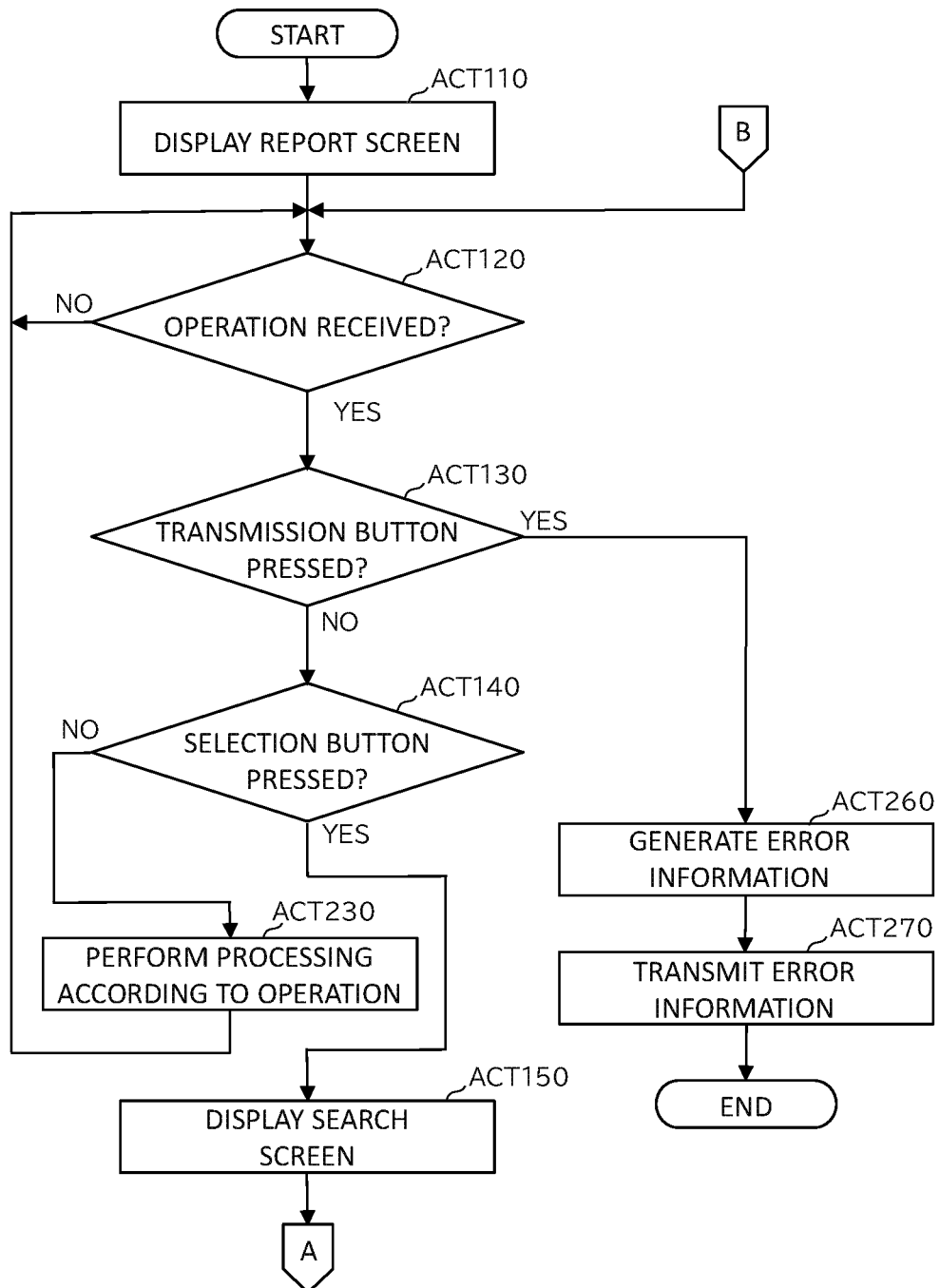
FIG. 3 is a flowchart of a process of transmitting first sound information selected by a user to another apparatus.
Figure 4:
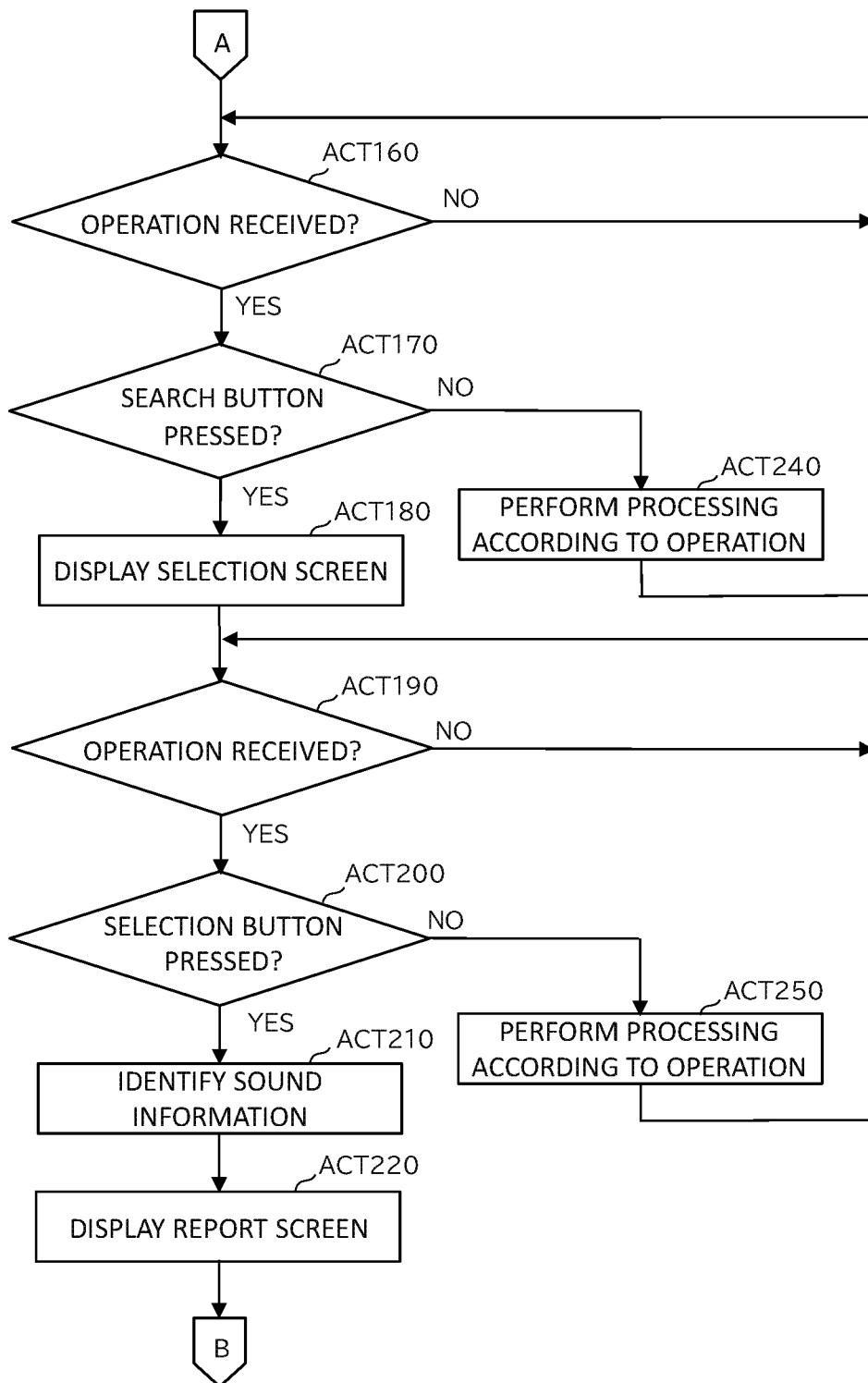
FIG. 4 is a flowchart of a process of transmitting first sound information selected by a user to another apparatus.

FIG. 3 and FIG. 4 are flowcharts of processes of transmitting the first sound information selected by a user to another device. Hereinafter, a case will be described in which the control unit 300 has detected an operation for displaying a report screen before a process in ACT 110 illustrated in FIG. 3 is performed. The report screen is a screen for the image processing apparatus 100 to accept an operation from a user. Specifically, the report screen is an image for the image processing apparatus 100 to accept error information from a user. The error information refers to information indicating a malfunction type that has occurred in the image processing apparatus 100. Further, the operation may be performed by a button included in the control panel 120. In addition, when the control panel 120 is a touch-enabled display, the operation may be performed by a software key displayed on the display 110.

Figure 5:
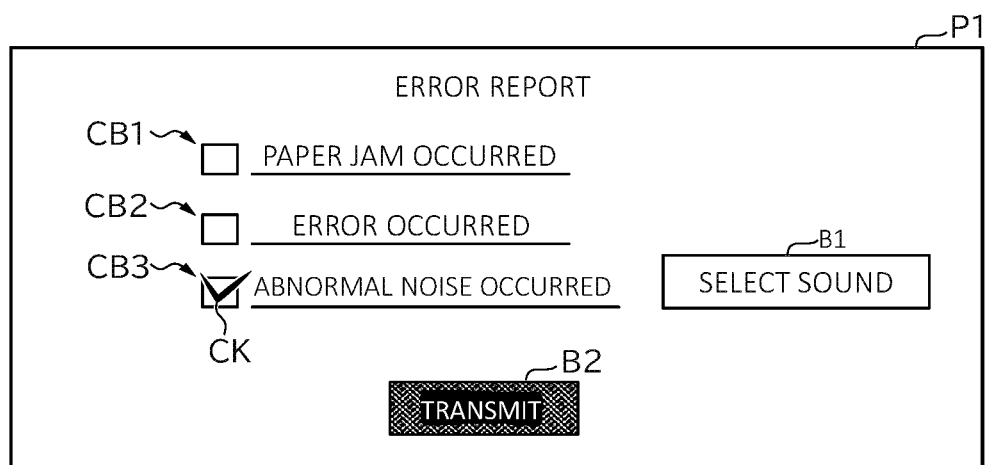
FIG. 5 is a diagram illustrating a report screen displayed on a display.

The control unit 300 causes the display 110 to display the report screen (ACT 110). FIG. 5 is a diagram illustrating an example of the report screen displayed on the display 110.

A screen P1 illustrated in FIG. 5 illustrates an example of the report screen. The screen P1 includes, for example, images CB1 to CB3, an image B1, and an image B2.

The image CB1 is an image indicating a check box. Further, the image CB1 is associated with paper jam occurrence information indicating that a paper jam has occurred in the image processing apparatus 100. For this reason, in the example illustrated in FIG. 5, a character string "PAPER JAM" is shown next to the image CB1. When a selection operation (e.g., click, tap, or the like) is performed on the image CB1, the check image is superimposed on the check box indicated by the image CB1. The check image is an image indicating that a selection operation has been performed on an image indicating a check box, such as the image CB1. If the selection is made, the control unit 300 includes the paper jam occurrence information associated with the image CB1 in error information indicating an error that has occurred in the image processing apparatus 100. The image CB1 may be an image indicating another input form having a function similar to that of the check box.

The image CB2 is an image indicating a check box. Further, the image CB2 is associated with error occurrence information indicating that an error has occurred in the image processing apparatus 100. Therefore, in the example illustrated in FIG. 5, a character string "ERROR OCCURRED" is shown next to the image CB2. When a selection operation (e.g., click, tap, or the like) is performed on the image CB2, the check image is superimposed on the check box indicated by the image CB2. In the selection is made, the control unit 300 includes the error occurrence information associated with the image CB2 in error information indicating an error that has occurred in the image processing apparatus 100. The image CB2 may be an image indicating another input form having a function similar to that of the check box.

The image CB3 is an image indicating a check box. Further, in the image CB3, the abnormal sound generation information indicating that an abnormal noise has occurred in the image processing apparatus 100. For this reason, in the example illustrated in FIG. 5, a character string "ABNORMAL NOISE MADE" is shown next to the image CB3. When a selection operation (e.g., click, tap, or the like) is performed on the image CB3, the check image is superimposed on the check box indicated by the image CB3. In this example, the check image is superimposed on the check box indicated by the image CB3. The image CK illustrated in FIG. 5 is an example of the check image. In such a case, the control unit 300 includes the abnormal sound generation information associated with the image CB3 in error information when a malfunction that has occurred in the image processing apparatus 100. The image CB2 may be an image indicating another input form having a function similar to that of the check box.

The image B1 is an image indicating a button. In addition, the image CB3 is associated with the image B1. Specifically, when the check image is superimposed on the image CB3, the image B1 becomes selectable. On the other hand, when the check image is not shown on the image CB3, the image B1 is not selectable.

When a selection operation (e.g., click, tap, or the like) is performed on the image B1, the control unit 300 causes the display 110 to display a search screen instead of the report screen. The search screen is a screen for the image processing apparatus 100 to accept an operation from a user. Specifically, the search screen is a screen for the image processing apparatus 100 to accept from the user an operation of searching for a candidate of the sound information desired by the user from among the plurality of pieces of sound information. The image B1 may be an image showing another input form having the same function as that of the button.

The image B2 is an image indicating a button. When a selection operation (e.g., click, tap, or the like) is performed on the image B2, the control unit 300 generates error information. A process for generating the error information by the control unit 300 will be described later. In such a case, after generating the error information, the control unit 300 controls the network interface 310 to transmit the generated error information to another apparatus. The other devices are, for example, an information processing terminal of a person who performs maintenance work of the image processing apparatus 100, a server of a company that provides a maintenance service, a server of a sales source of the image processing apparatus 100, and the like. The other apparatus may be another information processing apparatus. Further, the image B1 may be an image showing another input form having the same function as that of the button.

After causing the report screen to be displayed on the display 110 in ACT 110, the control unit 300 waits until an operation is received through the report screen (ACT 120).

If it is determined that an operation has been accepted via the report screen (ACT 120, YES), the control unit 300 determines whether the received operation is a selection operation for the image B2 (ACT 130).

If the control unit 300 determines that the operation received in ACT 120 is a selection operation for the image B2 (YES in ACT 130), the control unit 300 performs the processing in ACT 260. The processing in ACT 260 will be described later.

On the other hand, when the control unit 300 determines that the operation received in ACT 120 is not a selection operation for the image B2 (ACT 130, NO), the control unit 300 performs the processing in ACT 140. That is, the control unit 300 determines whether the operation is a selection operation for the image B1 (ACT 140).

If the control unit 300 determines that the operation received in ACT 120 is not a selection operation for the image B1 (ACT 140 NO), the control unit 300 performs processing in accordance with the operation (ACT 230). More specifically, the operation is a selection operation one of the images CB1 to CB3. Therefore, the control unit 300 performs a processing corresponding to the image selected from the images CB1 to CB3.

For example, when the image on which the selection operation has been performed is the image CB1, the control unit 300 specifies the paper jam occurrence information as one of the information included in the error information. In addition, the control unit 300 superimposes the check image on the image CB1. Even in this case, if the check image is already superimposed on the image CB1, the control unit 300 re-determines the paper jam occurrence information as the information that is not included in the error information. Then, the control unit 300 deletes the check image superimposed on the image CB1.

For example, when the image on which the selection operation has been performed is the image CB2, the control unit 300 specifies the error occurrence information as one of the information included in the error information. In addition, the control unit 300 superimposes the check image on the image CB2. Even in the case where the check image is already superimposed on the image CB2, the control unit 300 re-identifies the error occurrence information as the information that is not included in the error information. Then, the control unit 300 deletes the check image superimposed on the image CB2.

For example, when the image on which the selection operation has been performed is the image CB3, the control unit 300 specifies the abnormal sound generation information as one of the information included in the error information. In addition, the control unit 300 superimposes the check image on the image CB3. In addition, the control unit 300 makes the image B1 selectable. Even in such a case, if the check image is already superimposed on the image CB3, the control unit 300 re-identifies the abnormal sound generation information as the information that is not included in the error information. Then, the control unit 300 deletes the check image superimposed on the image CB3. Further, the control unit 300 makes the image B1 un-selectable.

After the processing in ACT 230 is performed, the control unit 300 transitions to ACT 120, and waits until an operation is received via the report screen.

Figure 6:
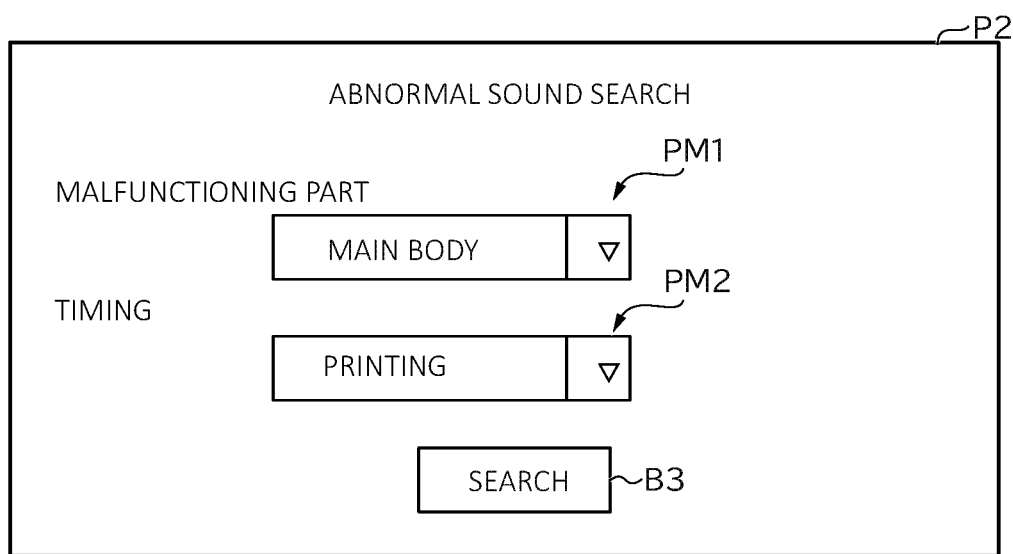
FIG. 6 is a diagram illustrating a search screen displayed on a display.

On the other hand, if the control unit 300 determines that the operation received in ACT 120 is a selection operation for the image B1 (ACT 140 YES), the control unit 300 causes the display 110 to display the above-described search screen (ACT 150). Here, a search screen will be described. FIG. 6 is a diagram illustrating an example of the search screen displayed on the display 110.

A screen P2 illustrated in FIG. 6 illustrates an example of the search screen. The image P2 includes, for example, an image PM1, an image PM2, and an image B3.

The image PM1 is an image indicating a pull-down menu. Also, the image PM1 is associated with a plurality of pieces of malfunctioning part candidate information indicating a candidate of a part where an error has occurred in the image processing apparatus 100. For this reason, in the example illustrated in FIG. 6, a character string "MALFUNCTIONING PART" is shown next to the image PM1. When a selection operation (e.g., click, tap, or the like) is performed on the image PM1, the control unit 300 causes the display 110 to display a list of the plurality of pieces of malfunctioning part candidate information associated with the image PM1. The user may select, from the list displayed on the display 110, the malfunctioning part candidate information indicating a location where the user infers that a malfunction has occurred in the image processing apparatus 100. When one of the plurality of pieces of malfunctioning part candidate information are selected by the user, the control unit 300 causes the image PM1 to display the selected piece of malfunctioning part candidate information. In the example illustrated in FIG. 6, the control unit 300 causes the image PM1 to display "MAIN BODY" as the selected malfunctioning part candidate information.

Here, the location of the image processing apparatus 100 indicated by each of the plurality of pieces of the malfunctioning part candidate information is, for example, a main body, a finisher, a document feeder, an external paper feeding cassette, or the like, but is not limited thereto. The "MAIN BODY" displayed on the image PM1 illustrated in FIG. 6 indicates the main body of the image processing apparatus 100. Further, the image PM1 may be an image showing another input form having a function similar to that of the pull-down menu.

The image PM2 is an image indicating a pull-down menu. Further, the image PM2 is associated with a plurality of pieces of timing candidate information indicating the candidates for the timing at which the error has occurred in the image processing apparatus 100. For this reason, in the example illustrated in FIG. 6, a character string "OCCURRENCE TIMING" is shown near the image PM2. When a selection operation (e.g., click, tap, or the like) is performed on the image PM2, the control unit 300 causes the display 110 to display a list of the plurality of pieces of timing candidate information associated with the image PM2. The user can select, from the list displayed on the display 110 in this way, timing candidate information indicating a timing at which the user infers that a malfunction has occurred in the image processing apparatus 100. When one of the plurality of pieces of timing candidate information is selected by the user, the control unit 300 causes the selected timing candidate information to be displayed in the image PM2. In the example illustrated in FIG. 6, the control unit 300 causes the image PM2 to display "PRINTING" as the selected timing candidate information.

Here, the portions indicated by the plurality of pieces of timing candidate information are, for example, always during image reading, during printing, after printing, and the like, but are not limited thereto. The image PM2 may be an image showing another input form having the same function as that of the pull-down menu.

The image B3 is an image indicating a button. When a selection operation (e.g., click, tap, or the like) is performed on the image B3, the control unit 300 searches for sound information. More specifically, the control unit 300 searches for one or more pieces of sound information corresponding to the malfunctioning part candidate information displayed in the image PM1 and the timing candidate information displayed in the image PM2, from the n pieces of sound information. For this reason, in each of the n pieces of sound information, one or more pieces of malfunctioning part candidate information and one or more pieces of timing candidate information are associated with each other. The control unit 300 may be configured to perform the search by comparing sounds learned in a machine learning model (e.g., neural network, deep learning, etc.) with the sound indicated by each of the plurality of sound information. In such a case, the malfunctioning part candidate information and the timing candidate information may not be associated with each of the plurality of pieces of sound information. For example, the control unit 300 may input all the pieces of sound information to the model after the selection operation is performed on the image B3, and extract one or more pieces of sound information corresponding to the piece of malfunctioning part candidate information and the piece of timing candidate information. Further, the image B3 may be an image showing another input form having a function similar to that of the button. Further, the search for the sound information may be performed by a search server communicably connected to the image processing apparatus 100. In such a case, the n pieces of sound information are stored in the search server.

After causing the search screen to be displayed on the display 110 in ACT 150, the control unit 300 waits until an operation is received via the search screen (ACT 160).

If it is determined that an operation has been received via the search screen (ACT 160, YES), the control unit 300 determines whether the received operation is a selection operation for the image B3 (ACT 170).

If it is determined that an operation received in ACT 160 is not a selection operation for the image B3 (ACT 160, NO), the control unit 300 performs a process in accordance with the operation (ACT 240). More specifically, the operation is a selection operation on any one of the image PM1 and the image PM2. For this reason, the control unit 300 performs a process corresponding to one of the image selected from the image PM1 and the image PM2.

For example, when the image on which the selection operation has been performed is the image PM1, the control unit 300 causes the display 110 to display a list of the plurality of pieces of malfunctioning part candidate information associated with the image PM1. In addition, when one of the plurality of pieces of malfunctioning part candidate information included in the list are selected by the user, the control unit 300 causes the selected malfunctioning part candidate information to be displayed in the image PM1. Hereinafter, for convenience of description, the malfunctioning part candidate information displayed in the image PM1 among the plurality of pieces of malfunctioning part candidate information will be referred to as target malfunctioning part candidate information.

For example, when the image on which the selection operation has been performed is the image PM2, the control unit 300 causes the display 110 to display a list of the plurality of pieces of timing candidate information associated with the image PM2. In addition, when one of the pieces of timing candidate information included in the list is selected by the user, the control unit 300 causes the selected timing candidate information to be displayed in the image PM2. Hereinafter, for convenience of description, the timing candidate information displayed in the image PM2 among the plurality of pieces of timing candidate information will be referred to as target timing candidate information.

After the processing in ACT 240 is performed, the control unit 300 transitions to ACT 160, and waits until an operation is received via the search screen.

Figure 7:
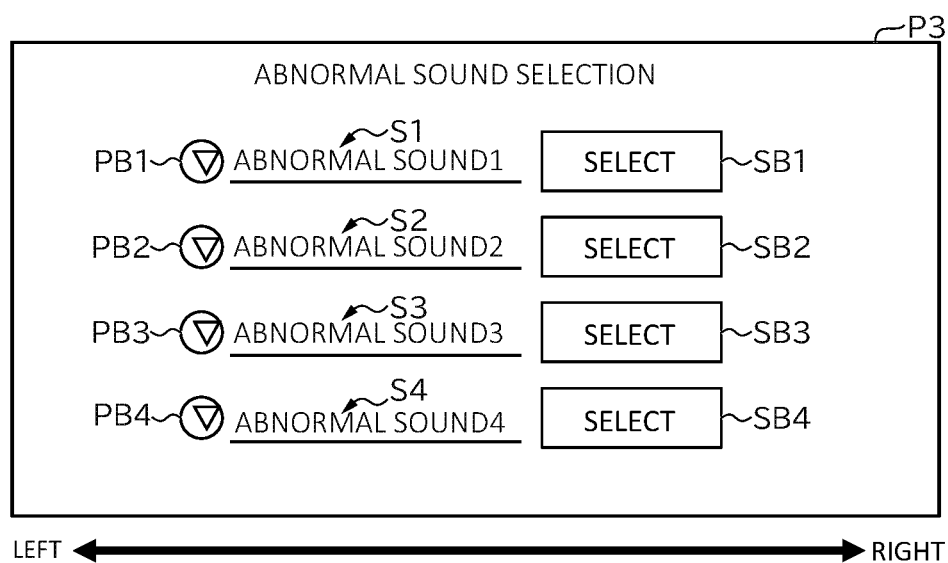
FIG. 7 is a diagram illustrating a selection screen displayed on a display.

On the other hand, when the control unit 300 determines that the operation received in ACT 160 is a selection operation for the image B3 (YES in ACT 170), the control unit 300 searches for sound information. That is, the control unit 300 searches for one or more pieces of sound information corresponding to the target occurrence location candidate information and the target timing candidate information from among the n pieces of sound information stored in the storage unit 320. Then, a selection screen corresponding to the result of the search is displayed on the display 110 (ACT 180). The selection screen is a screen for the image processing apparatus 100 to accept from the user an operation for selecting the desired sound information from the result of the search. FIG. 7 is a diagram illustrating an example of the selection screen displayed on the display 110.

A screen P3 illustrated in FIG. 7 illustrates an example of the selection screen. In the screen P3, one or more pieces of sound information extracted from the n pieces of sound information are displayed as a result of the search for the sound information performed by the control unit 300. The image P3 shows four pieces of sound information extracted from n pieces of sound information. In the example illustrated in FIG. 7, the four pieces of sound information are sound information S1-S4. The pieces of sound information may be referred to as reference sounds. In this context, reference sounds are sounds established beforehand as potentially being output by an image forming apparatus upon the occurrence of various malfunctions.

An arrow in FIG. 7 indicates the right direction and the left direction. In the example illustrated in FIG. 7, an image SB1 is displayed on the right side of the sound information S1. The image SB1 is an image indicating a button associated with the sound information S1. When the selection operation (e.g., click, tap, or the like) is performed on the image SB1, the control unit 300 specifies the sound information S1 as the sound information desired by the user. The image SB1 may be an image showing another input form having the same function as that of the button.

In the example illustrated in FIG. 7, an image PB1 is displayed on the left side of the sound information S1. The image PB1 indicates a button associated with the sound information S1. When a selection operation (e.g., click, tap, or the like) is performed on the image PB1, the control unit 300 outputs a sound signal based on the sound information S1 to the sound output unit 340, and causes the sound output unit 340 to output the sound indicated by the sound information S1. As a result, the user can hear what kind of sound the sound indicated by the sound information S1 displayed as a result of the search is. The image PB1 may be an image showing another input form having the same function as that of the button.

In the example illustrated in FIG. 7, an image SB2 is displayed on the right side of the sound information S2. The image SB2 is an image indicating a button associated with the sound information S2. When the selection operation (e.g., click, tap, or the like) is performed on the image SB2, the control unit 300 specifies the sound information S2 as the sound information desired by the user. The image SB2 may be an image showing another input form having the same function as that of the button.

In the example illustrated in FIG. 7, an image PB2 is displayed on the left side of the sound information S2. The image PB2 indicates a button associated with the sound information S2. When a selection operation (e.g., click, tap, or the like) is performed on the image PB2, the control unit 300 outputs a sound signal based on the sound information S2 to the sound output unit 340, and causes the sound output unit 340 to output the sound indicated by the sound information S2. As a result, the user can hear what kind of sound the sound indicated by the sound information S2 displayed as a result of the search is. The image PB2 may be an image showing another input form having the same function as that of the button.

In the example illustrated in FIG. 7, an image SB3 is displayed on the right side of the sound information S3. The image SB3 is an image indicating a button associated with the sound information S3. When the selection operation (e.g., click, tap, or the like) is performed on the image SB3, the control unit 300 specifies the sound information S3 as the sound information desired by the user. The image SB3 may be an image showing another input form having the same function as that of the button.

In the example illustrated in FIG. 7, an image PB3 is displayed on the left side of the sound information S3. The image PB3 indicates a button associated with the sound information S3. When a selection operation (e.g., click, tap, or the like) is performed on the image PB3, the control unit 300 outputs a sound signal based on the sound information S3 to the sound output unit 340, and causes the sound output unit 340 to output the sound indicated by the sound information S3. As a result, the user can hear what kind of sound the sound indicated by the sound information S3 displayed as a result of the search is. The image PB3 may be an image showing another input form having the same function as that of the button.

In the example illustrated in FIG. 7, an image SB4 is displayed on the right side of the sound information S4. The image SB4 is an image indicating a button associated with the sound information S4. When the selection operation (e.g., click, tap, or the like) is performed on the image SB4, the control unit 300 specifies the sound information S4 as the sound information desired by the user. The image SB4 may be an image showing another input form having the same function as that of the button.

In the example illustrated in FIG. 7, an image PB4 is displayed on the left side of the sound information S4. The image PB4 indicates a button associated with the sound information S4. When a selection operation (e.g., click, tap, or the like) is performed on the image PB4, the control unit 300 outputs a sound signal based on the sound information S4 to the sound output unit 340, and causes the sound output unit 340 to output the sound indicated by the sound information S4. As a result, the user can hear what kind of sound the sound indicated by the sound information S4 displayed as a result of the search is. The image PB4 may be an image showing another input form having the same function as that of the button.

As described above, in the selection screen, the user can select the sound information desired by the user from among the one or more pieces of sound information displayed as the search results. That is, the user can select, from among the one or more pieces of sound information, a sound similar to the abnormal noise occurred in the image processing apparatus 100 or the abnormal noise itself. Hereinafter, for convenience of description, the image SB1 to the image SB4 will be collectively referred to as a selection button unless it is necessary to distinguish the images SB1 to SB4 from each other. In the selection screen, the user may be able to select a plurality of pieces of sound information. Hereinafter, as an example, a case in which the user can select one piece of sound information in the selection screen will be described.

After the selection screen is displayed on the display 110 in ACT 180, the control unit 300 waits until an operation is received via the selection screen (ACT 190).

When it is determined that an operation has been received via the selection screen (ACT 190 YES), the control unit 300 determines whether the received operation is a selection operation for the selection button (ACT 200).

If it is determined that the operation received in ACT 190 is not a selection operation for the selection button (ACT 200, NO), the control unit 300 performs a process in accordance with the operation (ACT 250). More specifically, the operation is a selection operation to any one of the image PB1 to the image PB4. For this reason, the control unit 300 outputs, to the sound output unit 340, a sound signal corresponding to the sound information associated with the image on which the selection operation has been performed among the images PB1 to PB4. Accordingly, the control unit 300 causes the sound output unit 340 to output the sound indicated by the sound information.

For example, when the image on which the selection operation has been performed is the image PB1, the control unit 300 outputs a sound signal corresponding to the sound information S1 associated with the image PB1 to the sound output unit 340. Accordingly, the control unit 300 causes the sound output unit 340 to output the sound indicated by the sound information S1.

Further, for example, when the image to which the selection operation has been performed is the image PB2, the control unit 300 outputs a sound signal corresponding to the sound information S2 associated with the image PB2 to the sound output unit 340. Accordingly, the control unit 300 causes the sound output unit 340 to output the sound indicated by the sound information S2.

Further, for example, when the image to which the selection operation has been performed is the image PB3, the control unit 300 outputs a sound signal corresponding to the sound information S3 associated with the image PB3 to the sound output unit 340. Accordingly, the control unit 300 causes the sound output unit 340 to output the sound indicated by the sound information S3.

Further, for example, when the image to which the selection operation has been performed is the image PB4, the control unit 300 outputs a sound signal corresponding to the sound information S4 associated with the image PB4 to the sound output unit 340. Accordingly, the control unit 300 causes the sound output unit 340 to output the sound indicated by the sound information S4.

After the processing in ACT 250 is performed, the control unit 300 transitions to ACT 190, and waits until an operation is received via the selection screen.

On the other hand, if the control unit 300 determines that the operation received in ACT 200 is a selection operation for the selection button (ACT 200, YES), the control unit 300 identifies the sound information (ACT 210). That is, the control unit 300 identifies the sound information associated with the selection button on which the selection operation has been performed as the sound information desired by the user.

For example, when the selection operation is made on the image SB1, the control unit 300 specifies the sound information S1 associated with the image SB1 as the sound information desired by the user.

Further, for example, when the selection operation is made on the image SB2, the control unit 300 specifies the sound information S2 associated with the image SB2 as the sound information desired by the user.

Further, for example, when the selection operation is made on the image SB3, the control unit 300 specifies the sound information S3 associated with the image SB3 as the sound information desired by the user.

Further, for example, when the selection operation is made on the image SB4, the control unit 300 specifies the sound information S4 associated with the image SB4 as the sound information desired by the user.

Figure 8:
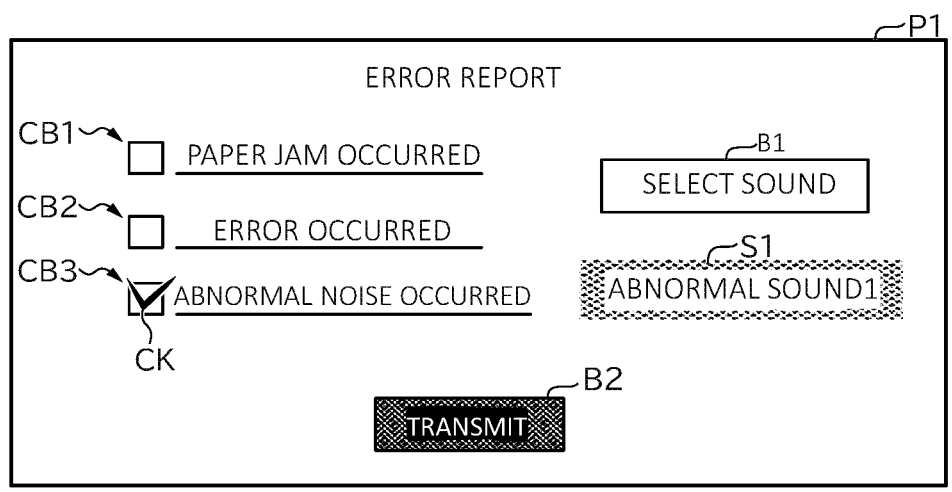
FIG. 8 is a diagram illustrating a report screen including sound information selected by a user.

After identifying the sound information desired by the user in ACT 210, the control unit 300 causes the report screen including the identified sound information to be displayed (ACT 220). FIG. 8 is a diagram illustrating an example of the report screen including sound information selected by a user. As shown in FIG. 8, the control unit 300 displays the sound information specified as the sound information desired by the user on the right hand side of the image B1. In the example illustrated in FIG. 8, the sound information specified by the control unit 300 as the sound information desired by the user is the sound information S1.

After the report screen is displayed in ACT 220, the control unit 300 transitions to ACT 130, and again determines whether the operation received via the report screen is a selection operation for the image B2.

When it is determined that the operation received via the report screen is a selection operation for the image B2, the control unit 300 transitions to ACT 260 as described above, and generates the error information. Here, the processing in ACT 260 will be described.

In ACT 260, the control unit 300 identifies one or more images on which the selection operation has been performed among the images CB1 to CB3. For example, the control unit 300 identifies an image in which an image indicating that a selection operation has been performed is superimposed on the image CB1 to the image CB3. Then, the control unit 300 specifies information associated with the identified image as the information included in the error information.

For example, when the image CB1 is identified as the image on which the selection operation has been performed, the control unit 300 specifies the paper jam occurrence information associated with the image CB1 as the image included in the error information.

Further, for example, when the image CB1 is identified as the image on which the selection operation has been performed, the control unit 300 specifies the error occurrence information associated with the image CB2 as an image included in the error information.

Further, when the image CB1 is identified as the image on which the selection operation has been performed, the control unit 300 specifies the abnormal sound generation information associated with the image CB3 as the image included in the error information. In addition, the control unit 300 specifies the sound information displayed in the report screen as the information included in the error information. In the example illustrated in FIG. 8, the control unit 300 specifies the sound information S1 as the information included in the error information.

In this way, the control unit 300 identifies the information included in the error information. Then, the control unit 300 generates error information including the specified information.

After generating the error information in ACT 260, the control unit 300 controls the network interface 310 to transmit the error information to the above-described other apparatus (ACT 270), and ends the processing.

As described above, the control unit 300 controls the network interface 310 to transmit the sound information corresponding to the operation received by the control panel 120 among the n pieces of sound information (i.e., the sound information S1 to the sound information Sn) indicating sounds different from each other to the other apparatus. This means that the user can select sound information indicating a sound similar to the abnormal noise that has occurred in the image processing apparatus 100, and the image processing apparatus 100 can notify another apparatus of the selected sound information. Therefore, the image processing apparatus 100 can notify the sound selected by the user as a sound similar to the abnormal noise. In particular, when each of the n pieces of sound information is information indicating the abnormal sound that can be generated from the image processing apparatus 100, the image processing apparatus 100 can more reliably notify the other apparatus of the sound similar to the abnormal noise. Also, even if each of the plurality of pieces of sound information is a sound that is different from the abnormal sound that can be generated from the image processing apparatus 100, the image processing apparatus 100 can notify another apparatus of a sound that the user thinks is similar to the abnormal noise.

When the first sound identification information is transmitted to another apparatus, the control unit 300 performs the following processing in ACT 260. That is, the control unit 300 generates, as the information to be included in the error information, the information for identifying the sound information specified as the information included in the error information as the first sound identification information. Then, the control unit 300 generates error information including the generated first sound identification information. In such a case, the control unit 300 may generate error information that does not include the sound information, and may generate error information including the sound information.

Modification Examples

Hereinafter, modified examples of an embodiment will be described.

Figure 9:
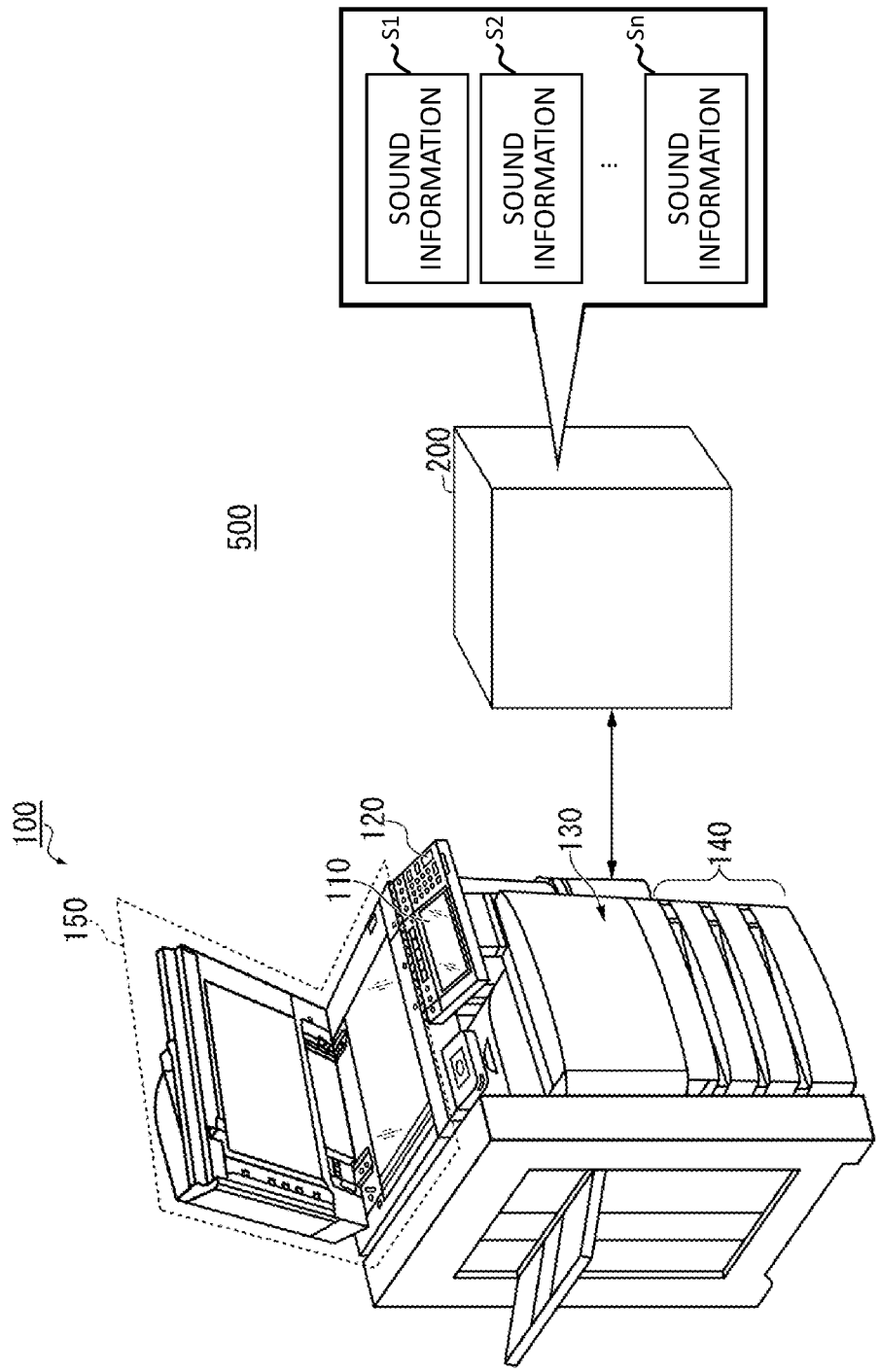
FIG. 9 is a diagram illustrating an information processing system according to a modified example of an embodiment.

FIG. 9 is a diagram illustrating an information processing system 500 according to a modification example.

The information processing system 500 includes the image processing apparatus 100 described above and an information processing apparatus 200.

In the modification example, the storage unit 320 of the image processing apparatus 100 does not store the n pieces of sound information S1 to Sn. Instead, the n pieces of sound information S1 to Sn are stored in the information processing apparatus 200.

For example, the information processing apparatus 200 may be the above-described search server. The information processing apparatus 200 may have a function as a search server, and may be another information processing apparatus, such as a personal computer (PC). In response to a request from the image processing apparatus 100, the information processing apparatus 200 outputs sound information corresponding to the request to the image processing apparatus 100.

For example, the information processing apparatus 200 performs a process related to the retrieval of the sound information in the processing of ACT 150 illustrated in FIG. 3. More specifically, in response to a request from the image processing apparatus 100, the information processing apparatus 200 searches for the sound information associated with each of the target malfunctioning part candidate information and the target timing candidate information from among the n pieces of the sound information. Then, the information processing apparatus 200 outputs the information indicating the searched result to the image processing apparatus 100.

In addition, in ACT 250 illustrated in FIG. 4, in response to a request from the image processing apparatus 100, the information processing apparatus 200 outputs the sound information indicated by the request to the image processing apparatus 100. For example, when a selection operation is performed on the image PB1 illustrated in FIG. 7, the image processing apparatus 100 outputs a request to acquire the sound information S1 to the information processing apparatus 200. In response to the request, the information processing apparatus 200 outputs the sound information S1 to the image processing apparatus 100. Accordingly, the image processing apparatus 100 can cause the sound output unit 340 to output the sound indicated by the sound information S1.

Further, the information processing apparatus 200 may be configured to, for example, perform the processing of ACT 260 and ACT 270 illustrated in FIG. 3.

Figure 10:
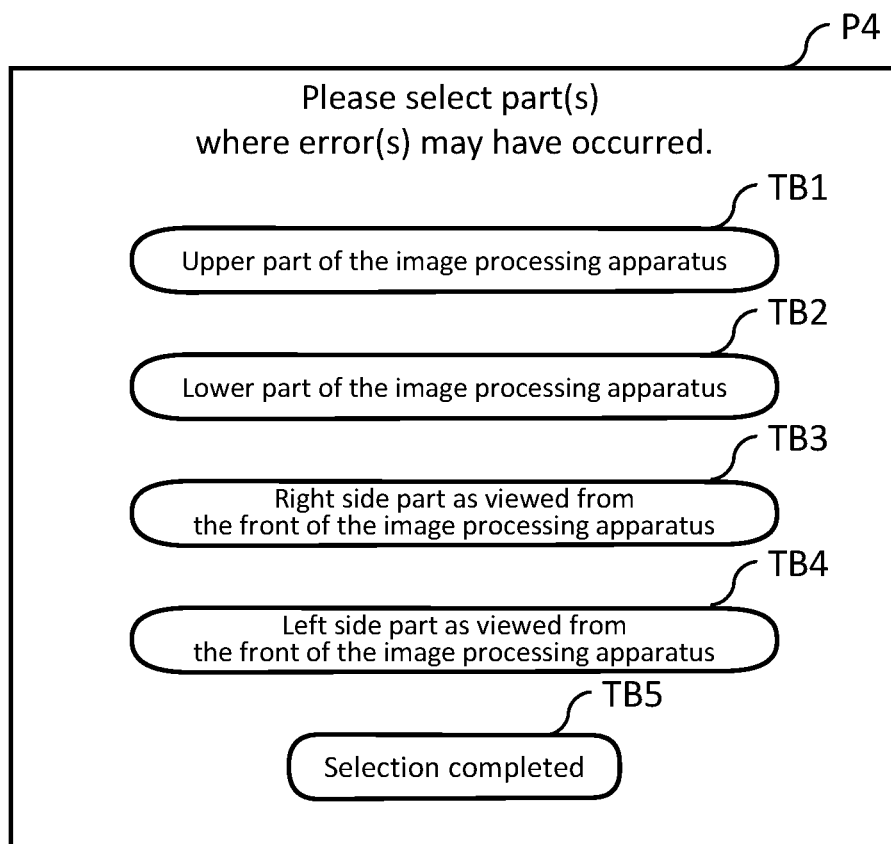
FIG. 10 is a diagram illustrating a selection screen displayed on a display.

In one modified example, instead of having the user select a malfunctioning part candidate of the information processing apparatus 100 via the image PM1 in the screen as shown in FIG. 6, the control unit 300 may allow the user to select the malfunctioning part candidate via a selection screen shown in FIG. 10. The selection screen allows the user to select one or more parts where an error may have potentially occurred.

FIG. 10 is a diagram illustrating a screen image P4 of such a selection screen. The image P4 includes, for example, five images TB1 to TB5. The image P4 may include other images in place of or in addition to some or all of those five images.

The image TB1 is an image of a button. The image TB1 is associated with a text indicating an upper part of the image processing apparatus 100 as a malfunctioning part candidate. Such an upper part is, for example, between the top of the image processing apparatus 100 and the printer 130, but is not limited to this. The upper part of the image processing apparatus 100 may include at least one of the top of the image processing apparatus 100 and the printer 130, or it may not include both the top of the image processing apparatus 100 and the printer 130.

When the image TB1 is selected by the user (e.g., by clicking or tapping the button), the control unit 300 changes the appearance of the image TB1 (e.g., color, size, or the like) indicating that the image TB1 has been selected. Further, by such an operation, the control unit 300 recognizes that the upper part of the image processing apparatus 100 has been selected as a malfunctioning part candidate.

The image TB2 is also an image of a button. The image TB2 is associated with a text indicating a lower part of the image processing apparatus 100 as a malfunctioning part candidate. Such a lower part is, for example, between the printer unit 130 and the lowermost portion of the image processing apparatus 100, but is not limited thereto. In addition, the lower part of the image processing apparatus 100 may include at least one of the printer unit 130 and the lowermost portion of the image processing apparatus 100, or may not include both the printer unit 130 and the lowermost portion of the image processing apparatus 100.

When the image TB2 is selected by the user (e.g., by clicking or tapping the button), the control unit 300 changes the appearance of the image TB2 (e.g., color, size, or the like) indicating that the image TB2 has been selected. In such a case, the control unit 300 recognizes that the lower part of the image processing apparatus 100 has been selected as a malfunctioning part candidate.

The image TB3 is an image of a button. The image TB3 is associated with a text indicating a right side part of the image processing apparatus 100 as a malfunctioning part candidate. The part located on the right side of the image processing apparatus 100 is, for example, between: a virtual center line dividing the image processing apparatus 100 into the left and right bodies when viewed from the front of the image processing apparatus 100, and the right end of the image processing apparatus 100. Here, the front surface of the image processing apparatus 100 refers to the surface of the image processing apparatus 100 on which the sheet storage unit 140 is provided. The part located on the right side of the image processing apparatus 100 may include the right end of the image processing apparatus 100, or may not include the right end of the image processing apparatus 100.

When the image TB3 is selected by the user (e.g., by clicking or tapping the button), the control unit 300 changes the appearance of the image TB3 (e.g., color, size, or the like). By such an operation, the control unit 300 recognizes that the right side part of the image processing apparatus 100 has been selected as a malfunctioning part candidate.

The image TB4 is an image of a button. The image TB4 is associated with a text indicating a left side part of the image processing apparatus 100 as a malfunctioning part candidate. The part located on the left side of the image processing apparatus 100 is, for example, between the virtual center line dividing the image processing apparatus 100 and the left end of the image processing apparatus 100. The part located on the left side of the image processing apparatus 100 may include the left end of the image processing apparatus 100, or may not include the left end of the image processing apparatus 100.

When the image TB4 is selected by the user (e.g., by clicking or tapping the button), the control unit 300 changes the appearance of the image TB4 (e.g., color, size, or the like). By such an operation, the control unit 300 recognizes that the left side of the image processing apparatus 100 has been selected as a malfunctioning part candidate.

The image TB5 is an image of a button. When the image TB5 is selected by the user (e.g., by clicking or tapping the button), the control unit 300 controls the display 110 to display a screen image similar to the image P2 (see FIG. 6) instead of the image P4. Here, unlike the image P2, one or more malfunctioning part candidates that have been selected via the image P4 are displayed or listed in a certain area of the screen. The control unit 300 may cause the display 110 to display the images P2 and/or P4 in any manner.

Figure 11:
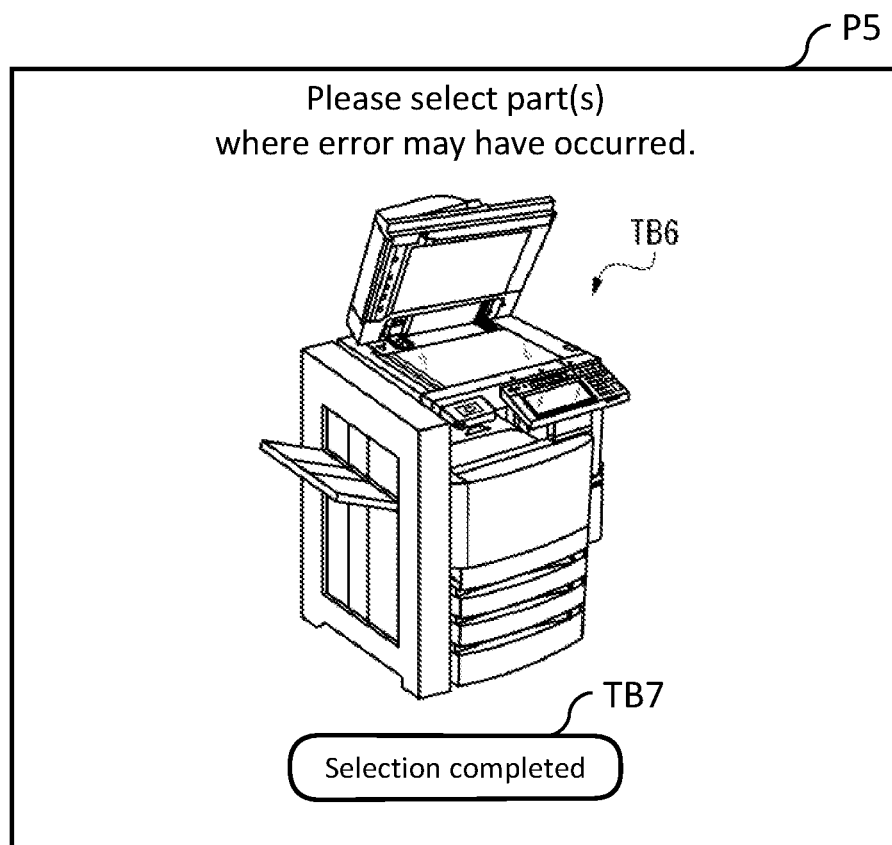
FIG. 11 is a diagram illustrating a selection screen displayed on a display.

In one modified example, the control unit 300 may display a screen image P5 shown in FIG. 11 so that the user can select one or more malfunctioning part candidates instead of the image PM1 illustrated in FIG. 6.

As shown in FIG. 11, the image P5 includes, for example, two images TB6 and TB7. Note that the image P5 may include another image instead of one or both of these two images, or in addition to both of the images.

The image TB6 shows the exterior of the image processing apparatus 100. The image TB6 includes a plurality of regions each corresponding to a part of the image processing apparatus 100. For example, the printer unit 130 is associated with one of the regions in the image TB6 where the printer unit 130 is actually installed. That is, a certain part X of the image processing apparatus 100 is associated with one of the regions in the image TB6 where the part X is actually installed or located. When one or more regions are selected by the user (e.g., by clicking or tapping the regions), the control unit 300 recognizes that one or more parts of the image processing apparatus 100 associated with the selected regions have been selected as malfunctioning part candidates.

The image TB7 is an image of a button. When the image TB7 is selected by the user (e.g., by clicking or tapping the button), the control unit 300 controls the display 110 to display a screen image similar to the image P2 shown in FIG. 6. Here, unlike the image P2, one or more malfunctioning part candidates that have been selected via the image P5 are displayed in a certain area of the screen. The control unit 300 may cause the display 110 to display the images P2 and/or P5 in any manner.

When one or more malfunctioning part candidates are selected, the controller 300 generates error information indicating which part(s) is malfunctioning. Such error information may include at least one of malfunctioning part candidate information, timing information, and log information. Here, the log information indicates a log of the operations of the image processing apparatus 100 collected within a certain time period just before an error has occurred. The log information includes some or all of, for example, job information about one or more jobs executed in the period, a self-diagnosis code output by the image processing apparatus 100 in the period, one or more error codes output by the image processing apparatus 100 in the period, a change history of firmware in the period, and an on/off history of the power of the image processing apparatus 100 in the period. For example, the job information indicates a job for five-copy printing with color, double-sided, and 2-in-1 settings. For example, the self-diagnosis code indicates various setting values of the image processing apparatus 100.

For example, the malfunctioning part candidate information is included in the error information when a selection(s) is made through the button PM1 of the image P2, the buttons TB1-TB4 of the image P4, or the regions in the image P5. In addition, the timing information is included in the error information when a selection is made on the button PM2 of the image P2. Furthermore, in a case where the log information is included in the error information, the control unit 300 includes, for example, a log stored in the storage unit 320 during the period as the log information. The log is stored in the storage unit 320 according to any known method. The period may be a period up to 10 minutes before the selection operation is made in the image P2, but is not limited thereto.

More specifically, the abnormal noise in the above descriptions is a sound/noise different from a sound/noise generated by the image processing apparatus 100 that is operating correctly. In other words, the abnormal noise is a sound/noise generated from the image processing apparatus 100 when an abnormality occurs in the image processing apparatus 100. For example, the abnormal noise is: (a) a sound/noise generated in addition to a "normal" sound generated by the image processing apparatus 100 that is working correctly, (b) a sound/noise generated instead of such a normal sound, or (c) a series of otherwise normal sounds for which a part of the series is missing.

As described above, the image processing apparatus 100 includes the control panel 120 that receives the operation and the control unit 300 that control the network interface 310 to transmit the first sound information (e.g., sound information S1) corresponding to the first operation received by the control panel 120 (e.g., the selection operation for each of the images SB1 to SB4) from the plurality of pieces of sound information (e.g., the sound information S1 to the sound information Sn) indicating the different sound from each other. Accordingly, the image processing apparatus 100 can notify a maintenance operator of the sound selected by the user as the sound similar to the abnormal noise.

A program for executing the function of any unit of the image processing apparatus 100 and the information processing apparatus 200 described above may be recorded in a non-transitory computer-readable recording medium, and the program may be read and executed by the computer system. The "computer system" herein includes hardware such as peripheral devices and an operating system (OS). The "computer-readable recording medium" refers to a portable medium such as a flexible disk, a magneto-optical disk, a ROM, or a compact disk (CD) ROM, and a storage device such as an HDD built in the computer system. Further, the "computer-readable recording medium" includes a memory of a server or a client computer that stores a program received via a network such as the Internet or a communication line such as a telephone line.

The program may be transmitted from a computer system in which the program is stored in a storage device or the like to another computer system via a transmission medium or by a transmission wave in the transmission medium. Here, a "transmission medium" for transmitting a program refers to a medium having a function of transmitting information, such as a network such as the Internet, or a communication line such as a telephone line. The program described above may be a program for realizing a part of the above-described functions. Further, the above program may be a differential file or program capable of realizing the above-described functions in combination with other files or programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:
1. An image processing apparatus, comprising:
a display device; and
a processor configured to:
   generate a first screen for display on the display device and on which one of a plurality of malfunctioning part candidates of the image processing apparatus and one of a plurality of timings at which a particular sound was output by the image processing apparatus that malfunctioned, are selectable,
   when a first malfunctioning part candidate and a first timing are selected on the first screen, generate a second screen for display on the display device and on which one or more reference sounds corresponding to the particular sound are selectable, and
   when one of the reference sounds is selected on the second screen, generate error information indicating the first malfunctioning part candidate and the selected reference sound.

2. The image processing apparatus according to claim 1, wherein
the first malfunctioning part candidate is one of a main body, a finisher, a document feeder, and an external paper feeding cassette, and
the first timing is one of always, during image reading, during printing, and after printing.

3. The image processing apparatus according to claim 2, wherein the processor is further configured to include information about the selected timing of the particular sound in the error information.

4. The image processing apparatus according to claim 3, wherein the processor is further configured to include a log of operations of the image processing apparatus generated during a particular period in the error information.

5. The image processing apparatus according to claim 2, wherein one or more candidate reference sounds are listed on the second screen for selection.

6. The image processing apparatus according to claim 5, further comprising:
a speaker, wherein
the processor is further configured to, in response to a user input on the second screen, control the speaker to play a sound corresponding to a selected candidate reference sound.

7. The image processing apparatus according to claim 1, wherein the first screen shows a plurality of selectable buttons each indicating a malfunctioning part candidate of the image processing apparatus.

8. The image processing apparatus according to claim 1, wherein the first screen shows an exterior of the image processing apparatus and includes a plurality of selectable regions each corresponding to a part of the image processing apparatus.

9. The image processing apparatus according to claim 1, wherein the error information includes a data file of the selected reference sound.

10. The image processing apparatus according to claim 1, wherein the error information indicates a location at which a data file of the selected reference sound is stored.

11. A method to be performed by an image processing apparatus, the method comprising:
displaying a first screen on which one of a plurality of malfunctioning part candidates of the image processing apparatus and one of a plurality of timings at which a particular sound was output by the image processing apparatus that malfunctioned, are selectable;
when a first malfunctioning part candidate and a first timing are selected on the first screen, displaying a second screen on which one or more reference sounds corresponding to the particular sound are selectable; and
when one of the reference sounds is selected on the second screen, generating error information indicating the first malfunctioning part candidate and the selected reference sound.

12. The method according to claim 11, wherein
the first malfunctioning part candidate is one of a main body, a finisher, a document feeder, and an external paper feeding cassette, and
the first timing is one of always, during image reading, during printing, and after printing.

13. The method according to claim 12, further comprising:
including information about the selected timing of the particular sound in the error information.

14. The method according to claim 13, further comprising:
including a log of operations of the image processing apparatus generated during a particular period in the error information.

15. The method according to claim 12, wherein one or more candidate reference sounds are listed on the second screen for selection.

16. The method according to claim 15, further comprising:
in response to a user input on the second screen, playing a sound corresponding to a selected candidate reference sound.

17. The method according to claim 11, wherein the first screen shows a plurality of selectable buttons each indicating a malfunctioning part candidate of the image processing apparatus.

18. The method according to claim 11, wherein the first screen shows an exterior of the image processing apparatus and includes a plurality of selectable regions each corresponding to a part of the image processing apparatus.

19. The method according to claim 11, wherein the error information includes a data file of the selected reference sound.

20. A non-transitory computer readable medium storing a program causing an image processing apparatus to execute a method comprising:
generating a first screen for display on a display device and on which one of a plurality of malfunctioning part candidates of the image processing apparatus and one of a plurality of timings at which a particular sound was output by the image processing apparatus that malfunctioned, are selectable;
when a first malfunctioning part candidate and a first timing are selected on the first screen, generating a second screen for display on the display device and on which one or more reference sounds corresponding to the particular sound are selectable; and
when one of the reference sounds is selected on the second screen, generating error information indicating the first malfunctioning part candidate and the selected reference sound.

* * * * *